United States Patent [19]

Michaels

[11] 3,839,651

[45] Oct. 1, 1974

[54] LEVEL SENSING ARRANGEMENT AND CONTROL CIRCUIT

[75] Inventor: Bruce Ernest Michaels, Florissant, Mo.

[73] Assignee: Chemetron Corporation, Chicago, Ill.

[22] Filed: Feb. 23, 1973

[21] Appl. No.: 335,246

[52] U.S. Cl. .................... 307/308, 73/295, 73/304, 307/252 J, 307/310

[51] Int. Cl. .................... G01f 23/00

[58] Field of Search ......... 307/252 J, 310, 311, 235, 307/308; 219/494, 501, 510; 73/295, 304; 340/229, 228, 244 R, 244 C

[56] References Cited

UNITED STATES PATENTS 3,578,987 5/1971 De Werth et al. .............. 307/310 X

*Primary Examiner*—John Zazworsky

*Attorney, Agent, or Firm*—Mason, Kolehmainen, Rathburn & Wyss

[57] ABSTRACT

A level sensing control circuit is provided for an ultrasonic nebulizer of the type which utilizes a piezoelectric crystal oscillator in contact with liquid in a nebulizing chamber to generate an aerosol of micron sized droplets which can be used for any desired purpose such as humidification, medication or the like. The liquid level in the chamber is detected by means of a temperature sensitive resistance element which is thermally coupled to liquid in the nebulizing chamber and current flow through this element is employed to control the firing of an SCR which in turn removes power from the oscillator. A light emitting diode latches the SCR on and also provides a visible indication that liquid should be added to the chamber. The same SCR is responsive to current flow through the piezo electric crystal oscillator and removes power from the oscillator in the event that excessive current is drawn by the oscillator.

9 Claims, 1 Drawing Figure

PATENTED OCT 1 1974 3,839,651
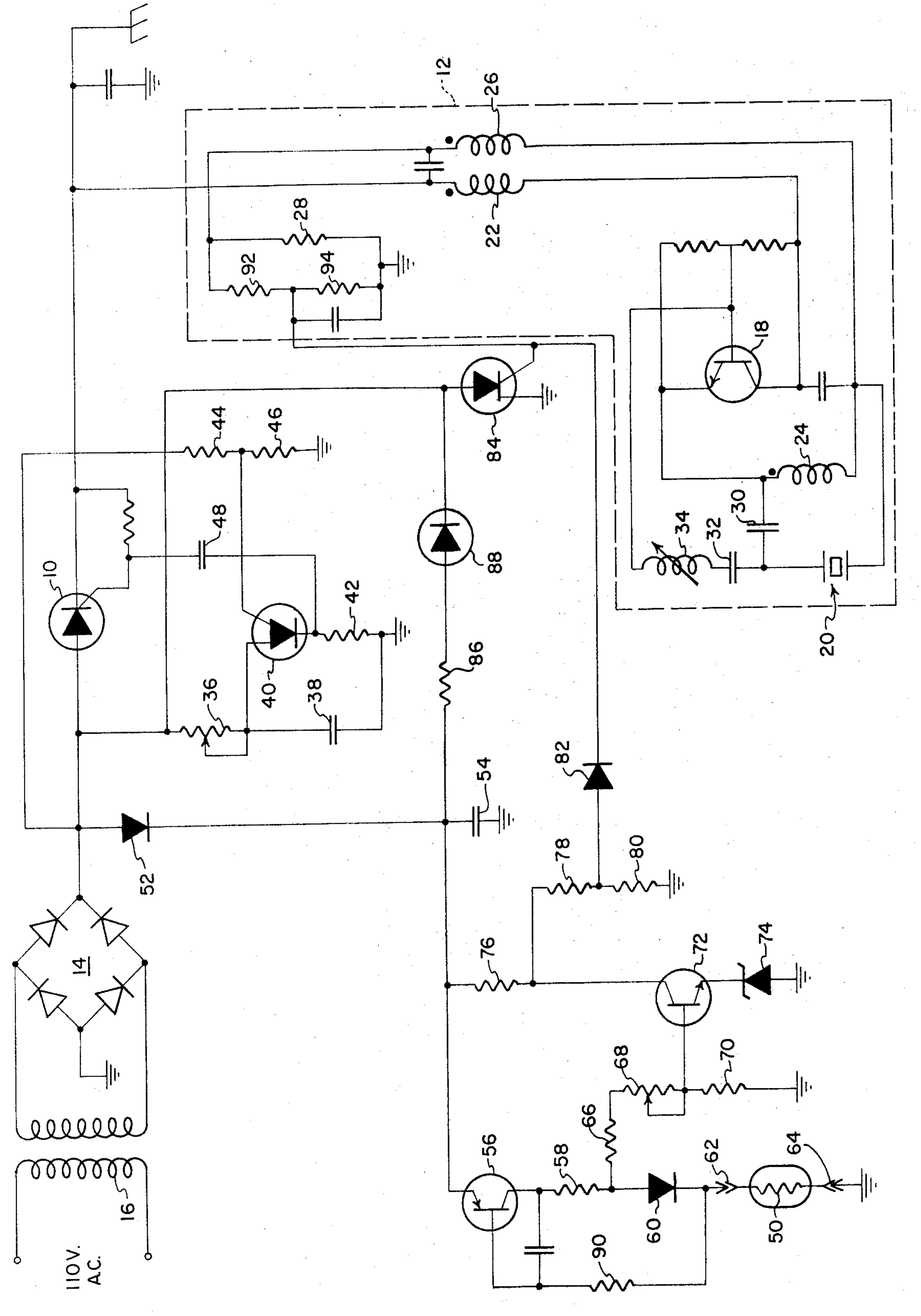

LEVEL SENSING ARRANGEMENT AND CONTROL CIRCUIT

The present invention relates to a control circuit for sensing the liquid level in a container or chamber. While the invention is of general application to liquid level sensing, it is particularly suited for use with and will be described in connection with an ultrasonic nebulizer of the type which utilizes a piezoelectric crystal oscillator coupled to liquid in a nebulizing chamber to generate an aerosol of micron sized droplets which can be used for any desired purpose such as humidification, medication or the like.

Arrangements have been heretofore proposed for controlling the liquid level in the nebulizing chamber of an ultrasonic nebulizer. For example, in Best U.S. Pat. No. 3,490,697 an arrangement is employed wherein a float valve, which normally functions to maintain the level of liquid in the nebulizing chamber constant, is also employed to actuate a switch when the liquid supply to the neubulizer is exhausted and the liquid level in the reservoir drops to a predetermined value. Such a mechanical arrangement has the disadvantage that switch actuation is not positive under emergency conditions such as top-over, and the like. Also, the float can hang up or bind and prevent switch actuation at the proper time to prevent damage to the crystal. Furthermore, since the switch actuating member of Best is carried by the float, the location of the level sensing element is fixed and cannot readily be placed at any desired point as required to maintain a desired head of liquid over the piezoelectric crystal. In addition a float type switch actuating arrangement such as disclosed in the Best U.S. Pat. No. 3,490,697 is not fail safe, in the event of switch failure, and provides no visible indication to the operator that the liquid level has reached the point where the power to oscillator has been shut off and that the liquid supply should be replenished.

It is, therefore, an object of the present invention to provide a new and improved liquid level sensing control circuit which eliminates one or more of the above-discussed disadvantages of prior art arrangements.

It is another object of the present invention to provide a new and improved sensing control circuit wherein a resistance element is employed to provide an electrical indication by change in resistance when the liquid level has dropped to a predetermined point within the nebulizing chamber, this electrical signal being employed to prevent power from thereafter being supplied to the piezoelectric crystal oscillator.

It is another object of the present invention to provide a new and improved level sensing control circuit wherein facilities are provided for preventing power from being supplied to the oscillator in the event that the resistance element has an open circuit itself or has been improperly connected into the sensing circuit.

It is still another object of the present invention to provide a new and improved level sensing control circuit wherein a resistance element may be immersed in liquid within the chamber to be controlled and means are provided for accurately setting the point at which an output signal will be produced when the resistance element is no longer surrounded by liquid.

It is a further object of the present invention to provide a control circuit for an ultrasonic nebulizer wherein simplified facilities are provided for disabling the power supply in the event that an overload condition is produced in the piezoelectric crystal oscillator circuit.

It is still another object of the present invention to provide a new and improved control circuit for an ultrasonic nebulizer wherein a visible indication is provided when power is turned off either in response to a current overload condition in the oscillator circuit or in response to the lowering of liquid within the nebulizing chamber to a predetermined level.

It is another object of the present invention to provide a new and improved control circuit for an ultrasonic nebulizer which is simple in construction and may be readily manufactured on a mass production basis at low cost.

The invention, both as to its organization and method of operation, together with further objects and advantages thereof, will best be understood by reference to the following specification taken in connection with the accompanying drawings in which:

The single FIGURE of the drawings is a schematic diagram illustrating the features of the control circuit of the present invention.

Referring now to the single FIGURE of the drawings, the power supply control circuit arrangement of the present invention is therein illustrated as comprising a silicon controlled rectifier 10 which is connected in series with a suitable load circuit indicated generally at 12 across the output of a full wave rectifier bridge 14, the bridge circuit 14 being supplied with alternating current through the input transformer 16.

In the illustrated embodiment the load circuit 12 comprises a crystal oscillator circuit which includes the transistor 18 and a piezoelectric crystal 20. More particularly, the output of the SCR 10 is supplied through an input filter coil 22 to the collector of the transistor 18, the emitter of this transistor being connected through the main tank coil 24 of the oscillator and through a second filter coil 26 and the resistor 28 to ground, i.e., the other terminal of the full wave bridge circuit 14. The piezoelectric crystal 20 is connected across the coil 24 through a series capacitor 30 and feedback from the crystal 20 to the base of the transistor 18 is provided through the series connected capacitor 32 and tuning coil 34.

Considering now the manner in which a variable unidirectional potential is supplied to the load circuit 12 by control of the SCR 10, a charging circuit comprising the series connected potentiometer 36 and capacitor 38 is connected across the output of the bridge rectifier 14, the junction of the potentiometer 36 and capacitor 38 being connected to the anode electrode of the silicon controlled switch 40. The cathode of the switch 40 is connected through a resistor 42 to ground and the gate electrode of the silicon controlled switch 40 is connected to a voltage divider network comprising the resistors 44 and 46 which are likewise connected across the output of the bridge rectifier 14. The pulse developed during each cycle of alternating current across the output resistor 42 of the silicon controlled switch 40 is supplied through a capacitor 48 to the gate electrode of the series SCR 10 so as to control the point in each alternating cycle at which the SCR 10 is fired. The capacitor 38 thus charges during each cycle of the full wave rectifier voltage supplied to the charging circuit 36, 38 until the silicon control switch 40 fires at which time the capacitor 38 is discharged, a sharp pulse of current is supplied through the resistor 42, and the series SCR 10 is fired for the remainder of that alternating current cycle. However, the series SCR 10 is rendered nonconductive between each pulse of alternating current. Accordingly, by controlling the charging time of the capacitor 38 a variable output voltage is provided through the series SCR 10. This variable voltage is achieved by variation of the potentiometer 36. By employing the silicon controlled switch 40 rather than a unijunction transistor, a faster, higher energy trigger pulse is provided across the resistor 42 which permits a relatively insensitive low-cost series SCR 10 to be used so that a low-cost variable amplitude output potential is achieved.

In the illustrated embodiment the piezoelectric crystal 20 is arranged in physical contact with liquid in the nebulizing chamber of an ultrasonic nebulizer and provides a suitable mist or fog of very fine droplets above the surface of the liquid which may be employed for any suitable purpose, as will be readily understood by those skilled in the art. However, it is necessary to maintain a predetermined level of liquid above the crystal 20 so that it will remain adequately loaded and hence will not draw an excessive current. In order to insure that the power supply SCR 10 does not supply current to the crystal 20 in the event that the liquid level falls below a predetermined value, and in accordance with an important feature of the invention, a thermistor 50 is provided in physical contact with the liquid in the nebulizing chamber immediately above the crystal 20. The thermistor 50 is provided with a negative temperature coefficient such that if the temperature in the environment surrounding the thermistor 50 increases, the resistance of the thermistor 50 will decrease. Accordingly, if the liquid level in the nebulizing chamber falls by an amount sufficient to expose the thermistor 50, this thermistor is immediately heated up since no liquid remains to carry away the heat, and the resistance of the thermistor rapidly decreases. This decrease in resistance of the thermistor 50 is employed in accordance with the present invention to disable the charging circuit 36, 38 with the result that the series SCR 10 remains nonconductive and all power is removed from the transistor oscillator circuit 18, 20. Furthermore, a visible indication is provided of this condition, and the charging circuit is latched in a disabled condition until liquid is added to the nebulizing chamber.

More particularly, an auxiliary supply voltage is continuously produced by means of the diode 52 and capacitor 54 which are connected across the full wave bridge rectifier 14. The voltage thus produced across the capacitor 54 continues to be produced even though the series SCR 10 is rendered continuously nonconductive. The voltage across the capacitor 54 is supplied to the emitter of a fail safe transistor 56 the collector of which is connected through a resistor 58 and a diode 60 to the upper end of the thermistor 50, the bottom end of this thermistor being connected to ground. Accordingly, voltage is continuously being supplied to the series circuit comprising the elements 56, 58, 60 and 50, respectively. However, it will be noted that if the thermistor 50 is not properly plugged into its contacts 62 and 64 this series circuit is broken, as will be described in more detail hereinafter.

The voltage developed across the thermistor 50 by means of the above-described auxiliary voltage supply, is supplied to a voltage divider network including the resistor 66, the potentiometer 68 and the resistor 70, the junction of the potentiometer 68 and the resistor 70 being connected to the base of a transistor 72. The emitter of the transistor is connected through a Zener diode 74 to ground so that a fixed reference potential is continuously supplied to this emitter. The collector of the tranistor 72 is connected through a resistor 76 to the auxiliary supply voltage developed across the capacitor 54. An output voltage divider network comprising the resistors 78 and 80 is connected from the collector of the transistor 72 to ground.

Considering now the manner in which the above-described level sensing circuit of the present invention functions in the illustrated ultrasonic nebulizer, the nebulizing chamber is first filled with liquid so that liquid surrounds the thermistor 50 and a certain rate of heat transfer away from the thermistor 50 is established. Under these conditions the potentiometer 68 is adjusted so that the potential at the base of the transistor 72 is just slightly above the threshold at which the transistor 72 is turned on.

When the transistor 72 conducts a relatively small voltage is developed across the divider network 78, 80 since the collector-emitter path of the transistor 72 shunts this voltage divider network when the transistor 72 is conducting. The junction of the resistors 78 and 80 is supplied through a diode 82 to the gate electrode of a control SCR 84 the cathode of which is connected to ground and the anode of which is connected to the upper end of the charging network 36, 38. However, under the assumed condition of conduction of the transistor 72, the voltage developed across the resistor 80 and supplied through the diode 82 to the gate of the SCR 84 is not of sufficient magnitude to cause the SCR 84 to fire.

When the liquid in the nebulizing chamber falls sufficiently to expose the thermistor 50 to air, this thermistor rapidly heats up and its resistance drops so that the voltage at the base of the transistor 72 falls and this transistor is rapidly rendered nonconductive. When this occurs, a positive going output signal is developed across the resistor 80 which is coupled through the diode 82 to the gate of the SCR 84 and causes this SCR to fire. When the SCR 84 fires it short circuits the charging circuit 36, 38 and positively prevents the further development of trigger pulses from being supplied to the gate of the series SCR 10, with the result that the SCR 10 is rendered continuously nonconductive and power is no longer supplied to the load circuit 12.

In accordance with a further important feature of the invention, facilities are provided for latching the SCR 84 in its fully conductive condition in response to sensing of a fall in liquid level while at the same time providing a visible indication of this condition. More particularly, the auxiliary voltage continuously produced across the capacitor 54 is connected through a resistor 86 and a light emitting diode 88 to the anode of the SCR 84. The light emitting diode 88 may comprise a suitable gallium-arsenide diode which is arranged to emit red light of a single wave length when the diode is rendered conductive. Accordingly, when the SCR 84 fires, and the potential of its anode drops almost to ground, the diode 88 is rendered fully conductive and latches the SCR 84 in a fully conductive condition while at the same time providing a visible indication of the liquid level condition, due to conduction of the diode 88. The diode 88 may be conveniently placed on the front panel of the nebulizer equipment so as to be visible to the operator and thus inform him that the liquid in the nebulizing chamber needs to be replenished. It will be noted that the light emitting diode 88 is able to latch the SCR 84 in a fired condition only because the auxiliary supply voltage across the capacitor 54 is continuously provided even though the voltage to the load circuit 2 is disabled by rendering the series SCR 10 nonconductive.

Considering further the level sensing control circuit of the present invention it will also be noted that if the thermistor 50 becomes short circuited, an output signal is developed across the resistor 80 and the voltage to the load circuit 12 is discontinued so that it is impossible to operate the nebulizer without the liquid level protection normally afforded by an operative thermistor 50. This output signal is developed when the thermistor 50 is short circuited since the voltage applied to the base of the transistor 72 immediately drops in the same manner as when the thermistor 50 becomes exposed to air and its resistance decreases in response thereto.

In accordance with a further feature of the invention, the fail safe transistor 56 functions to produce an output signal and shut off power to the load circuit 12 in the event that an open circuit condition is produced in the thermistor 50. More particularly, if the thermistor developed an open circuit, or in the event that the thermistor is not initially plugged into the contact 62, 64 properly, the biasing current which is normally supplied to the base of the transistor 56 through the resistor 90 is removed because the series diode 60 becomes reverse biased and prevents this biasing current from being applied to the base of the transistor 56. The diode 60 becomes reverse biased under these conditions because its anode is connected to ground through the resistors 66, 68 and 70 and when an open circuit occurs in the thermistor 50 the cathode of this diode is left floating with the result that no biasing current is supplied to the transistor 56 and this transistor is rendered nonconductive. When the transistor 56 is turned off, the voltage across the resistor 70 disappears so that the transistor 72 is cut off and the abovedescribed output signal is produced across the resistor 80 which is effective to fire the SCR 84. The light emitting diode 88 again functions in the manner described above to latch the SCR 84 in a fired condition and provide a visible signal of the open circuit condition in the thermistor level sensing circuit.

In accordance with a further feature of the invention, the SCR 84 is also employed to disable the charging circuit 36, 38 and remove voltage from the load circuit 12 in the event that the current drawn by the oscillator circuit 18, 20 exceeds a predetermined value. More particularly, a voltage divider comprising the resistors 92 and 94 is connected across the resistor 28 and the junction of these two resistors is connected to the gate electrode of the SCR 84. Accordingly, when the current drawn through the series SCR 10 exceeds a predetermined safe value the gate electrode of the SCR 84 is raised by an amount sufficient to cause this SCR to fire. When this occurs the light emitting diode 88 is again rendered conductive and latches the SCR 84 in a fired condition while at the same time providing a visible signal that such an overload current condition exists. Accordingly, the SCR 84 may be fired either by an output signal produced from the thermistor control circuit in the manner described above, or the response to a current overload in the transistor oscillator circuit itself. Either of these conditions cause the charging circuit 36, 38 to be disabled and prevent further firing of the series SCR 10 so that no voltage is thereafter applied to the load circuit 12.

While there has been illustrated and described a single embodiment of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. A control circuit, comprising a source of alternating voltage, a load circuit, means including a control device for developing an output potential across said load circuit in response to said source of alternating voltage, a trigger circuit for controlling the conduction of said control device so that said output potential is stabilized, means including an SCR for disabling said trigger circuit so that said output potential is no longer developed across said load circuit, first control means responsive to the magnitude of current flow in said load circuit for firing said SCR when said current flow exceeds a predetermined value, means for developing an auxiliary supply voltage from said source of alternating voltage, and a light emitting diode connected between said auxiliary supply voltage and the anode of said SCR, said diode being rendered conductive when said SCR is fired, thereby to hold said SCR in a conductive state while at the same time conduction of said light emitting diode provides a visible indication that said predetermined value of current flow in said load circuit has been exceeded.

2. The combination of claim 1, wherein said trigger circuit includes a resistance - capacitance charging network for determining the point of conduction of said control device, and means connecting the anode - cathode circuit of said SCR across said charging network so that said trigger circuit is disabled when said SCR is fired.

3. The combination of claim 1, which includes second control means having a temperature sensitive resistance element and arranged to provide an output signal when a predetermined temperature value is exceeded and means responsive to said output signal for firing said SCR, thereby to disable said trigger circuit so that said output potential is no longer developed across said load circuit.

4. The combination of claim 3, wherein said second control means includes a transistor connected between said auxiliary supply voltage and said temperature sensitive element, means normally biasing said transistor to a conducting state, means for rendering said transistor nonconductive in response to an open circuit condition of said temperature sensitive element, and means controlled by said last named means for developing said output signal.

5. The combination of claim 4, which includes a second transistor, means for supplying a voltage proportional to the current flowing in said temperature sensitive element to the base of said second transistor, means connecting the collector of said second transistor to the gate electrode of said SCR, and means for adjusting the voltage supplied to the base of said second transistor so that said second transistor may be rendered conductive at a precise value of resistance of said resistance element.

6. A control circuit, comprising a source of alternating voltage, a load circuit, means including a control device for developing an output potential across said load circuit in response to said source of alternating voltage, a trigger circuit connected to said load circuit for rendering said control device conductive during each cycle of said alternating current source at a point in each cycle which varies in accordance with the potential across said load circuit, whereby said output potential is stabilized, means including an SCR for disabling said trigger circuit so that said output potential is no longer developed across said load circuit, a temperature sensitive resistance element, means normally establishing a flow of unidirectional current through said element of predetermined magnitude, and level detecting means connected to the gate electrode of said SCR and responsive to the unidirectional voltage level across said resistance element for rendering said SCR conductive when current flow through said element differs from said predetermined magnitude by a predetermined amount, thereby to disable said trigger circuit and terminate development of said voltage across said load circuit.

7. The combination of claim 6, wherein said level detecting means includes a transistor connected between said auxiliary supply voltage and said element, means normally biasing said transistor to a conducting state, means responsive to an open circuit condition of said element for rendering said transistor nonconductive, and means responsive to termination of current flow in said transistor for firing said SCR.

8. A control circuit, comprising a source of alternating voltage, a load circuit, means including a control device for developing an output potential across said load circuit in response to said source of alternating voltage, a trigger circuit for controlling the conduction of said control device so that said output potential is stabilized, means including an SCR for disabling said trigger circuit so that said output potential is no longer developed across said load circuit, a temperature sensitive resistance element, means normally establishing a flow of unidirectional current through said element of predetermined magnitude, level detecting means connected to the gate electrode of said SCR and responsive to the unidirectional voltage level across said resistance element for rendering said SCR conductive when current flow through said element differs from said predetermined magnitude by a predetermined amount, thereby to disable said trigger circuit and terminate development of said voltage across said load circuit, an auxiliary supply voltage from said source of alternating voltage, and a light emitting diode connected between said auxiliary supply voltage and the anode of said SCR, said diode being rendered conductive when said SCR is fired, thereby to hold said SCR in a conductive state while providing a visible indication of the resistance value of said element.

9. A control circuit, comprising a source of alternating voltage, a load circuit, means including a control device for developing an output potential across said load circuit in response to said source of alternating voltage, a trigger circuit for conrolling the conduction of said control device so that said output potential is stabilized, means including an SCR for disabling said trigger circuit so that said output potential is no longer developed across said load circuit, a temperature sensitive resistance element, means normally establishing a flow of unidirectional current through said element of predetermined magnitude, level detecting means connected to the gate electrode of said SCR and responsive to the unidirectional voltage level across said resistance element for rendering said SCR conductive when current flow through said element differs from said predetermined magnitude by a predetermined amount, thereby to disable said trigger circuit and terminate development of said voltage across said load circuit, means for developing an auxiliary supply voltage from said source of alternating voltage, a transistor connected between said auxiliary supply voltage and said element, means normally biasing said transistor to a conducting state, means responsive to an open circuit condition of said element for rendering said transistor nonconductive, and means responsive to termination of current flow in said transistor for firing said SCR.

* * * * *